Sept. 29, 1970  J. DEZZANI  3,531,038
SOLDERING DEVICE
Filed June 16, 1967  4 Sheets-Sheet 1

INVENTOR.
JOHN DEZZANI
BY
ATTORNEYS.

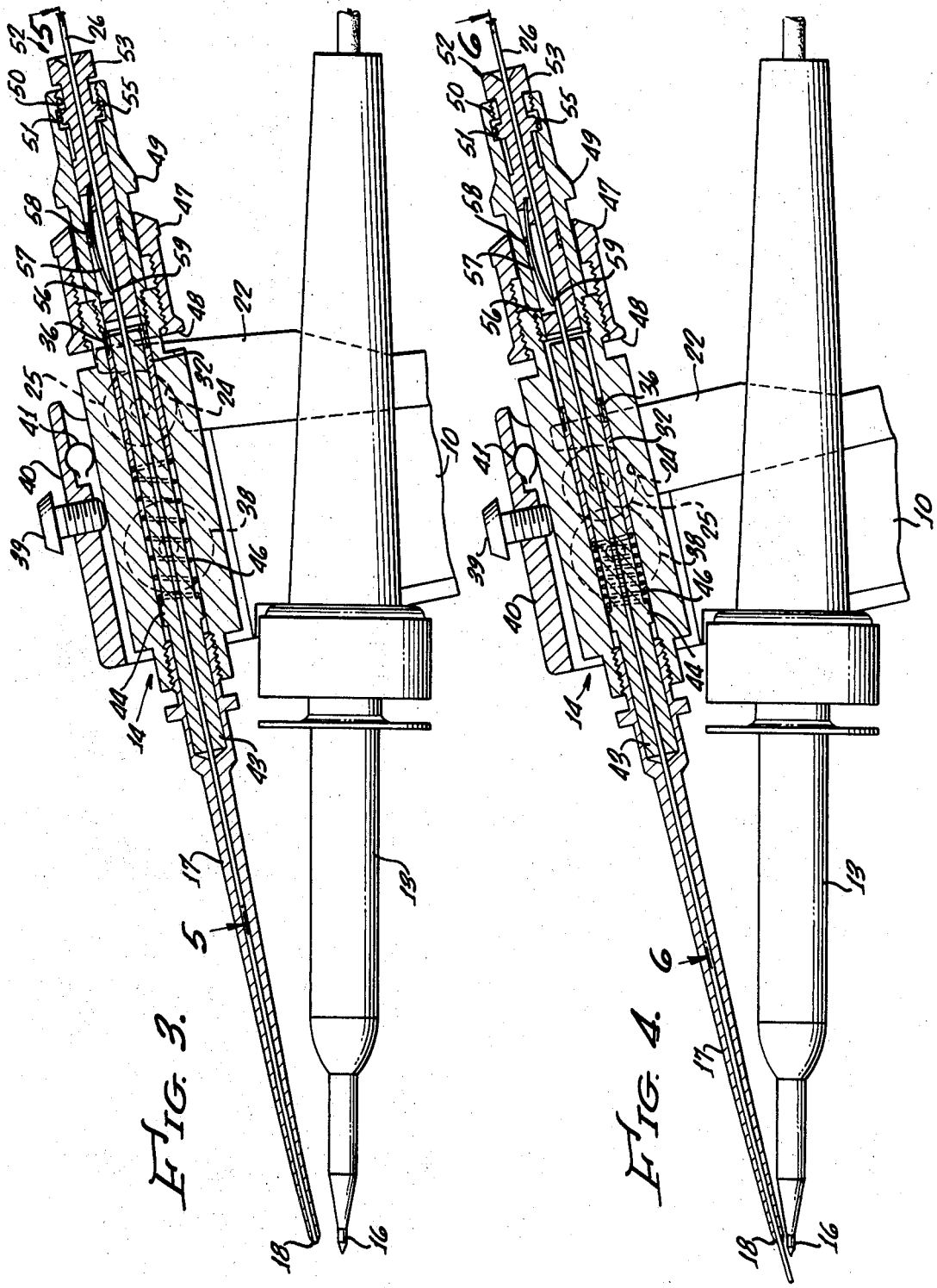

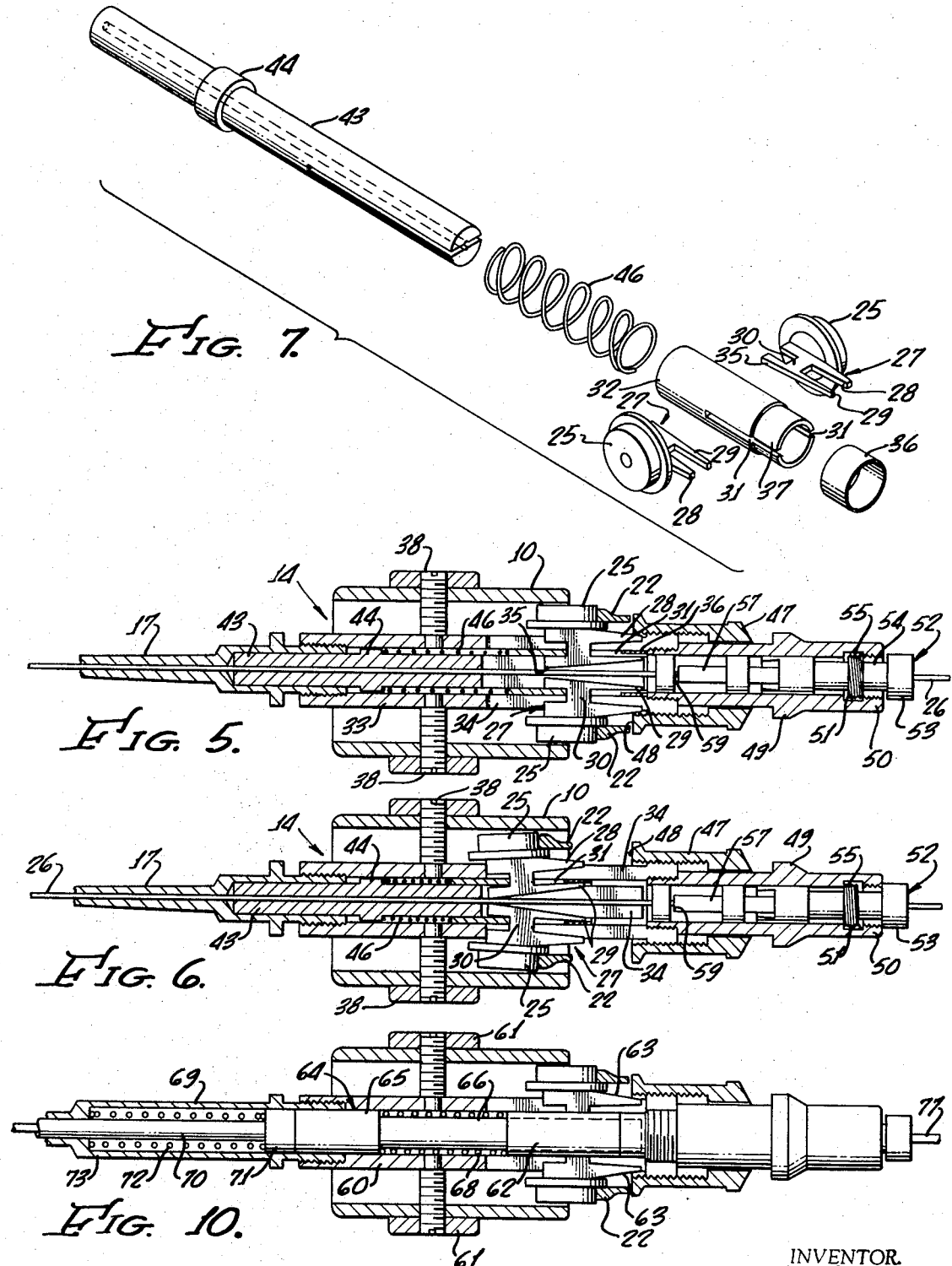

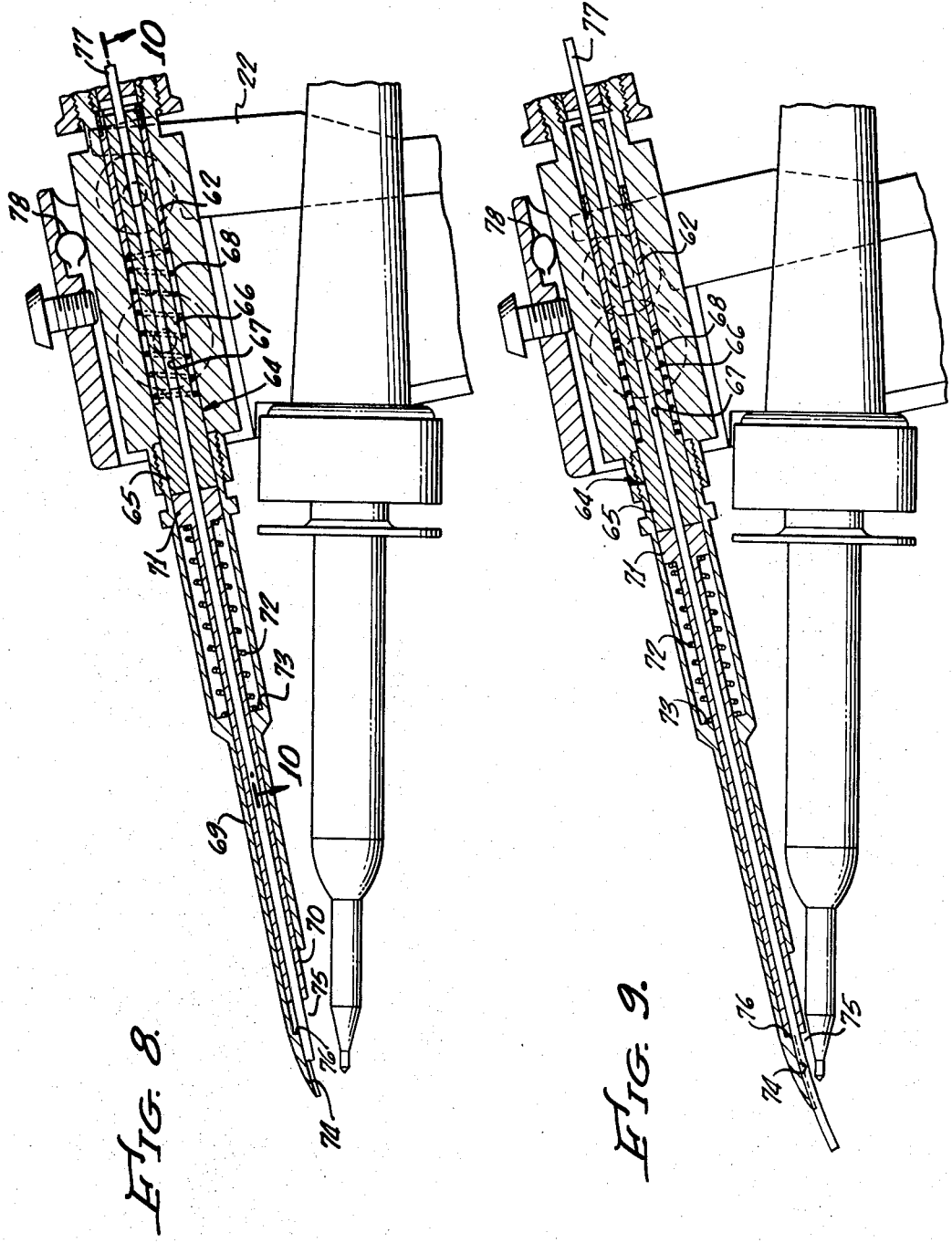

United States Patent Office

3,531,038
Patented Sept. 29, 1970

3,531,038
SOLDERING DEVICE
John Dezzani, 10513 Downey-Norwalk Road,
Norwalk, Calif. 90650
Filed June 16, 1967, Ser. No. 646,553
Int. Cl. B23k 1/00
U.S. Cl. 228—41                 10 Claims

ABSTRACT OF THE DISCLOSURE

A soldering device including a support mounting a soldering iron with the tip projecting therefrom. The support carries a pivotal guide arrangement which receives a length of solder and directs it from an outlet adjacent the tip. Jaw means are in the guide arrangement for gripping the solder and advancing it through the stroke upon actuation of the device. As the solder is advanced, the guide arrangement is pivoted to bring its outlet adjacent the tip of the soldering iron to become heated. At other times, the outlet of the guide arrangement is remote from the tip of the soldering iron to minimize heat transfer to the solder within the guide.

BACKGROUND OF THE INVENTION

The field of the invention

This invention relates to soldering devices incorporating a solder feed.

The prior art

There have been many past and unsuccessful efforts to provide solder-feeding arrangements associated with soldering irons. Some prior devices were complex and expensive, and others were difficult and cumbersome to operate. A common problem in the past has resulted from the effect of the heat of the soldering iron. In order to bring the solder into the vicinity of the tip of the soldering iron, it is necessary to guide the solder to this location. At the same time, the solder and the guiding arrangement in this manner are brought to a position adjacent the source of heat and thus become elevated in temperature. The heat from the soldering iron in these prior devices will cause the flux within the solder to boil back, so that some of the flux actually appears on the surface of the solder. The heat also expands the solder. The transfer of heat to the solder is aggravated by the relatively high coefficient of thermal conductivity of the solder, which commonly is characteristic also of the feeding mechanism. As a consequence, the solder has been caused to stick to the guiding arrangement almost immediately, so that continued solder-feeding cannot occur. This has meant that devices of this type were completely unsatisfactory.

SUMMARY OF THE INVENTION

The present invention provides an improved solder-feeding arrangement, avoiding the above-enumerated difficulties. It is a trigger-actuated gun giving one-hand operation. This means that the solder need not be handled by the operator, which is important because of the allergic reaction to solder experienced by many people. Discrete amounts of solder are metered progressively by movement of the trigger, and sticking of the solder never is a problem. The unit includes a housing mounting the trigger, which, through a system of levers, connects to a feed-tube assembly pivotally mounted on the housing. Within the feed-tube assembly is a means for gripping the solder that includes a pair of opposed jaws which are rocked into a position for contacting the solder as the trigger is moved. The jaws then are advanced forwardly, feeding the solder from the tip of the unit. The force from the trigger also causes the feed-tube assembly to pivot relative to the housing. As a result, the end of the feed tube is brought from a position remote from the tip of the soldering iron to a position of adjacency with the soldering iron. Thus, at the time the soldered joint is to be effected, the solder is brought into the proper operative position. Otherwise, however, the solder is positioned away from the soldering iron tip, so that it does not become unduly heated. The tip of the feed tube may be cut away on the side adjacent the soldering iron to reduce further the absorption of heat by the solder. Particularly for solder of larger diameters, a movable feed sleeve may be provided to support the solder as it is advanced out of the tip of the feed tube. This automatically retracts when the trigger is released and as the parts return to their original positions.

An object of this invention is to provide a means for simultaneously feeding solder and heating the solder to effect a soldered joint.

Another object of this invention is to provide a solder gun in which the solder is kept from sticking in the feed mechanism and is continually available for advancement in discrete amounts.

A further object of this invention is to provide a solder gun operable by one hand, so that a complete soldered joint may be effected while one hand remains free.

An additional object of this invention is to provide a device for feeding and melting solder which conserves solder and avoids contamination of the solder from handling.

Yet another object of this invention is to provide a solder feeding and heating device permitting backup pressure to be maintained on the solder core and also allowing easier soldering into deep recesses.

A still further object of this invention is to provide a solder feeding and heating device in which the solder is directed for proper engagement with the work or the tip of the soldering iron.

These and other objects will become apparent from the following detailed description taken in connection with the accompanying drawing.

BRIEF DESCRIPTION OF THE DRAWING

FIG. 3 is an enlarged fragmentary longitudinal sectional view of the solder-advancing portion of the device, with the parts in the retracted position;

FIG. 4 is a view similar to FIG. 3, with the parts in the actuated position;

FIG. 5 is an enlarged fragmentary longitudinal sectional view taken along line 5—5 of FIG. 3;

FIG. 6 is an enlarged fragmentary longitudinal sectional view taken along line 6—6 of FIG. 4;

FIG. 7 is an exploded perspective view of portions of the device that grip and guide the solder;

FIG. 8 is an enlarged fragmentary longitudinal sectional view of the solder-advancing portion of a modified form of the invention, with the parts in the retracted position;

FIG. 9 is a view similar to FIG. 8, with the parts in the actuated position; and FIG. 10 is an enlarged fragmentary longitudinal sectional view taken along line 10—10 of FIG. 8.

DESCRIPTION OF THE PREFERRED EMBODIMENTS

Figure 1:
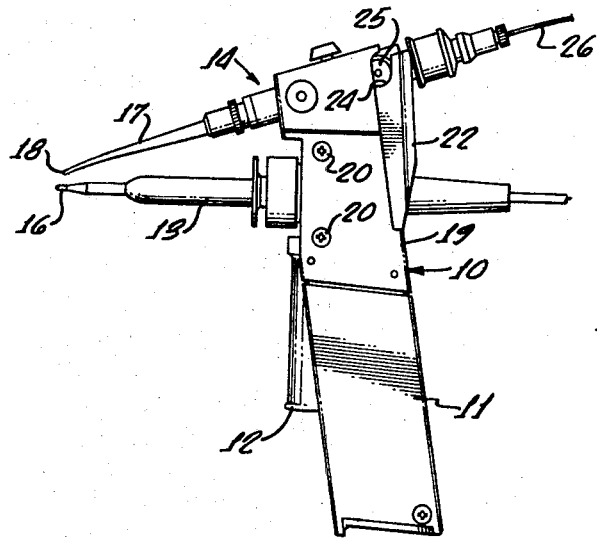
FIG. 1 is a side elevational view of the soldering arrangement of this invention.
Figure 2:
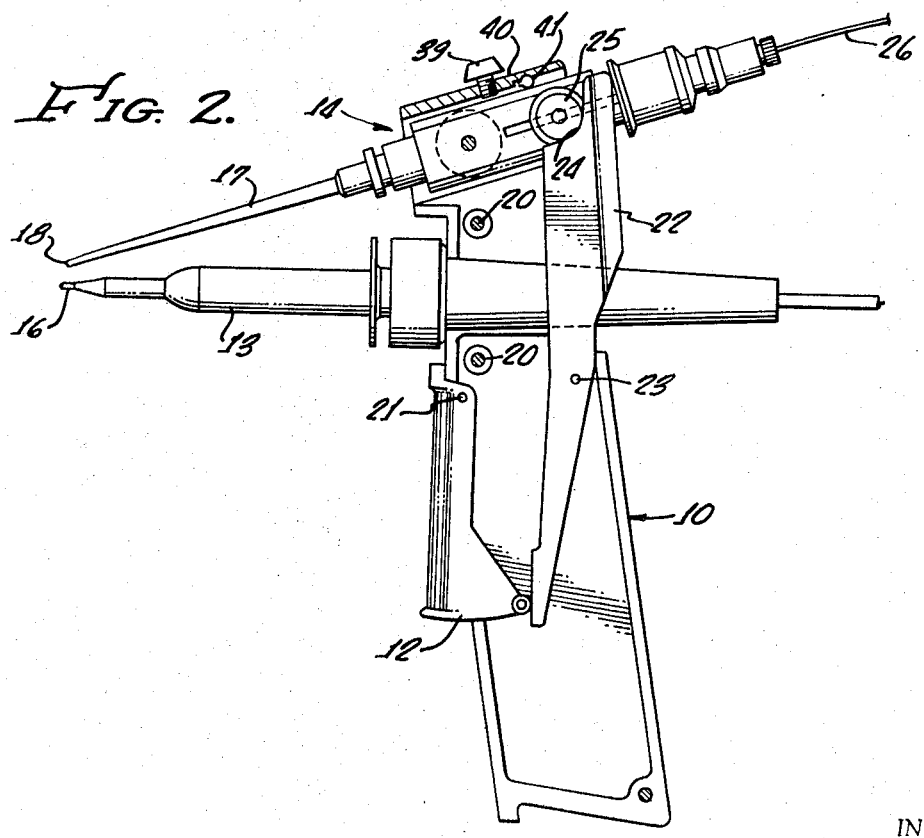
FIG. 2 is an enlarged side elevational view, partially broken away, of the device.

The solder gun of this invention, as shown in FIGS. 1 and 2, includes a housing 10 having a handle portion 11 adjacent which is a trigger 12. Extending through the housing is a soldering iron 13 of conventional construction. Above the soldering iron 13 is the solder-feeding unit 14, which advances the solder toward the tip 16 of the soldering iron when the trigger 12 is moved. The solder-feed unit 14 also is pivotally mounted so that the feed tube 17, from the end 18 of which the solder emerges, is tilted downwardly toward the tip 16 of the soldering iron simultaneously with the advancement of the solder.

The soldering iron 13 is held in its position extending transversely of the body 10 by being clamped relative to the body beneath a cover plate 19 held in place by screws 20. This allows easy replacement of the soldering iron without disturbing the operative components of the solder-feed unit. The upper end of the trigger 12 is located below the soldering iron 13 and is pivoted about a pin 21. The lower inner part of the trigger 12 engages the bottom end of a bell crank 22 which is pivoted relative to the housing about a pin 23. Upwardly of the handle portion, the bell crank 22 is bifurcated, so that it extends on either side of the soldering iron 13 and into the solder-advancement unit 14.

The upper ends of the bifurcated part of the bell crank 22 include arcuate surfaces 24 that engage the peripheries of circular discs 25. The latter elements connect to the jaws which are used in advancing the solder 26 when the trigger is actuated. From each disc 25 projects a jaw element 27, generally H-shaped in plan view, normally made of spring steel (see FIG. 7). The elements 27 include elongated portions 28 and 29 interconnected by a short post 30. The latter portion fits in a slot 31 formed in a tube 32 that is slidably received within a housing 33. The outer portions 28 of the jaw elements 27 slide along the surfaces of slots 34 extending longitudinally of the housing 33. The inner edges 35 of the inner jaw portions 29 are adjacent the solder wire 26 that extends through the tubular member 32 in between the jaw members. The edges 35 diverge toward the rear, thereby providing a relatively wide opening to facilitate introducing the solder into the space between the jaws. The post sections 30 of the jaw members 27 are slightly longer than the thickness of the wall of the tube 32, so that the jaw elements are free to rock relative to the tubular member 32. The jaw elements are confined to the tube 32 by a ring 36 that fits over the stepped-down end 37 of the tube 32.

The housing 33 is mounted on the upper end of the body 10 by means of opposed screws 38, which have cylindrical inner ends that fit within openings in the wall of the housing 33. Consequently, the housing 33 is pivotal relative to the body 10 about the axis of the screws 38. The amount of rotational movement permitted the housing 33 is relatively small, being limited by a stop screw 39 threaded into the top end 40 of the body 10. A spring 41 urges the housing 33 away from the stop 39 and in a clockwise direction as the device is illustrated.

Threaded onto the forward end of the housing 33 is the feed tube 17 which receives the solder 26 and directs it to the position adjacent the tip 16 of the soldering iron 13. The inner end of the feed tube 17 is recessed and receives one end of a guide sleeve 43. The latter member extends from the recessed portion of the feed tube 17 into the housing 33, with its opposite end being adjacent the slidable tube 32. The bore through the sleeve 43 fits rather closely around the solder so that the solder is centered by the guide sleeve. Intermediate its ends, the guide sleeve has an exterior enlargement 44. The shoulder provided by the enlargement 44 is engaged by one end of a compression spring 46. The opposite end of the spring 46 bears against the tubular element 32, biasing the latter member to the right as the device is shown.

A collar 47 is threaded onto the rearward end of the housing 33. Because of the threaded connection, the position of its forward edge 48 can be varied by turning the collar 47. The rearward upper corners of the bifurcated end of the bell crank 22 normally engage the forward end 48 of the collar 47. Because of the engagement between the bell crank and the discs 25, this limits the amount of movement of the tubular member 32 and the jaws 27 to the rearward, or to the right as the device is shown.

The rearward end of the housing 33 is internally threaded, as well as including the threads on its exterior for the collar 47. The internal threads are engaged by a sleeve 49 that projects beyond the rear of the housing 33. The outer end of the sleeve 49 includes an internally threaded portion 50, inwardly of which is a portion 51 of increased internal diameter. A pin 52 extends inwardly of the sleeve 49 toward the housing 33. The pin 52 includes a rotatable outer knob portion 53 and a shank portion 54 of relatively small cylindrical exterior diameter. Intermediate the ends of this section are outwardly projecting threads 55. The member 52 is connected to the member 49 by threading the portion 55 past the threads 50 in the member 49, so that the outwardly projecting threads then are within the enlarged bore portion 51. This gives the pin 52 freedom for limited axial movement relative to the member 49 as governed by the lengths of the threads 55 and the bore portion 51.

The pin 52 includes an axial bore through it and near its forward end is cut away, providing a recess 56 that communicates with the bore in the member 52. A leaf spring 57 is retained by a sleeve 58 to the pin unit 52, while its forward edge 59 rests on the longitudinal edges of the recess 56 adjacent the bore in the pin member. The spring 57, as best seen in FIGS. 3 and 4, is for holding the solder 26 against rearward movement following its advancement by the jaws 27.

In use of the device of this invention, the solder wire 26 is pushed into the rearward end through the pin element 52 and into the tubular member 32 intermediate the opposed faces 35 of the jaw members 37. It then is advanced incrementally by movement of the trigger 12. As the trigger is pressed, the bell crank 22 is pivoted about the pin 23. The arcuate surfaces 24 of the bifurcated upper end of the bell crank then react against the edges of the discs 25. Because of the clearance at the slots 31 provided by the length of the transverse sections 30 of the jaw members 27, pivotal movement is permitted for these members. In other words, as the surfaces 24 of the bell crank press against the edges of the discs 25, the jaws are rocked and assume the position shown in FIG. 6. This causes the forward portions of the opposed faces 35 of the jaws 27 to be brought against the solder 26 on opposite sides of the solder. Consequently, the opposed forward edges of the jaws dig into and hold the solder. Then, as the bell crank continues to rotate, the surfaces 24, through the discs 25, move the tubular member 32 and the jaws forwardly within the housing 33. The jaws, therefore, are moved through a stroke forwardly, advancing the solder with them as this occurs. When a full length of the solder has been extended through the unit, this means that the solder is fed from the feed tube 17 in an amount corresponding to the length of movement of the jaws 27. Forward movement on each stroke can continue until the post sections 30 of the jaws 27 are brought against the edges at the ends of the slots 34 in the housing 33, which stops further advancement.

Simultaneously with the forward advancement of the jaws 27, the arcuate upwardly facing surfaces 24 of the bell crank 22 impose a moment on the housing 33 to cause it to rotate counterclockwise as the device is shown. This comes about because the bell crank surfaces push upwardly as well as forwardly on the discs 25, with this force being exerted to the rearward of the pivotal connection afforded by the screws 38. This force causes the housing 33 to rotate about the axis of the screws 38 until such time as the upper edge of the housing 33 is brought into engagement with the lower edge of the stop screw 39. This limits the rotational movement of the housing 33.

As the housing 33 is caused to rotate in this manner, the forward end of the feed tube 17 is brought downwardly adjacent the tip 16 of the soldering iron. Therefore, as the solder is advanced out of the tip, it also is brought into juxtaposition with the source of heat. Consequently, the solder is brought automatically into a proper position for effecting a soldered joint simultaneously with the pulling of the trigger and the advancing of the increment of solder.

The amount of tilting of the housing 33, and hence the lateral movement of the forward end 18 of the feed tube 17, is controlled by rotating the stop screw 39 to vary the position of its lower end. Normally, the solder is made to contact the work adjacent the tip 16 of the iron, to be melted by heat received from the work. For particular specialized circumstances, the adjustment provided by the stop screw 39 allows the end of the feed tube to be shifted sufficiently to melt the solder directly by the iron tip 16.

After the soldering operation has been completed, the trigger is released. When that occurs, the spring 46 moves the jaw unit back to its original position. With no force being applied to the discs 25 from the bell crank 22, the jaws immediately release the solder and travel back without taking the solder with them. The spring 46, reacting through the discs 25 and the bell crank 22, also returns the trigger to its extended posititon. In addition, when the trigger is released, the spring 41 shifts the housing 33 in a clockwise direction back to its original position. This raises the end 18 of the feed tube 17 so that the solder remaining in the unit is shifted away from the tip of the soldering iron. This moves the solder to a position where it is not subjected to high temperature, but instead is insulated by the air gap between it and the tip 16 of the iron. Consequently, the flux in the solder will not boil to the surface, the solder will not expand unduly, and the solder will not stick in the feeding device but will be available for continual feeding.

While the jaws release the solder and move back freely to their original positions when the trigger is released, the spring 57 assures that the solder will not be retracted in any material amount by the dragging action of the jaws on the return stroke. The forward edge 59 of the spring 57 digs into the solder and prevents movement in the reverse direction.

A minor amount of reverse movement is desirable, however, in immediately removing the solder from the heat zone of the iron tip 16 and is permitted through the limited axial movement of the pin unit 52. On the return, therefore, the threaded portion 55 can shift slightly to the rear in the enlarged bore portion 51, permitting an initial small rearward movement of the solder as the trigger is released. After this increment of movement, the edge 59 of the spring precludes further retraction of the solder.

The bell crank is moved in the clockwise direction when the trigger is released until its upper edge engages the end 48 of the collar 47. When this occurs, the rearward movement of the bell crank, and hence of the jaws, is terminated as the jaws are positioned by the bell crank in view of the engagement between the discs 25 and the bell crank. Therefore, the collar 47 acts as a stop in limiting the rearward movement of the jaws. This, in turn, governs the net amount of movement permitted the jaws in the forward direction, and hence controls the amount of solder that is fed forwardly from the feed tube 17. The collar 47 is adjustable by rotating it on its threaded connection to the housing 33. Therefore, to increase the stroke and feed a larger increment of solder, the collar 47 is rotated to shift it to the right as the device is shown, which permits a larger amount of return travel of the jaws. Then, as the jaws again move forwardly, they have a longer stroke and can take more solder with them. Conversely, of course, tightening the collar to the left contracts the length of the stroke.

The embodiment of FIGS. 8, 9 and 10 is intended primarily for use in feeding solder of larger diameter than that used with the embodiment of FIGS. 1–7. Each version, however, will accommodate solder of different diameters. The design of FIGS. 8, 9 and 10 is essentially the same as the previously described arrangement, but includes also a guide for directing the solder at the tip where it engages the work, this being a movable element to leave the solder open for cooling by the surrounding air during times when the mechanism is retracted.

The device includes a housing 60 similar to the corresponding member 33 and pivotally mounted about the axis of screws 61. Inside the bore of the member 60 is a tubular element 62 into which extend jaws 63 similar to those described above. Forwardly of the tubular member 62 is a slide 64 having an enlarged end portion 65 spaced from the end of the tube 62. The slide 64 is tubular in nature, including a section 66 that projects toward the rear and passes into the tube 62. The section 66 includes slots 67 enabling it to clear the jaws and not interfere with their operation. A compression spring 68 is interposed between the enlarged end section 65 of the member 64 and the forward end of the tube 62.

Received within the feed tube 69 is a slidable guide 70, which is a hollow tubular member having an enlarged rearward end 71. A compression spring 72 extends between the wall 73 of the feed tube 69 and the enlarged end portion 71 of the guide member 70. This biases the guide member 70 to the rear, or to a retracted position where its end 71 engages the enlarged end 65 of the slide 64.

The forward end surface 74 of the feed tube 69 is arcuate, being inclined inwardly toward the tip 16 of the iron 13. The end 74 also has a cutaway side 75 adjacent the iron. A shoulder 76 is included in the feed tube 69 in the cutaway section outwardly of the surface 74.

In use of the device, the trigger is pressed as before, causing the bell crank to advance the tubular member 62 and the jaws within it. This results in the gripping of the solder 77 by the jaws to move the solder forwardly through its stroke. As this takes place, the springs 68 and 72 become compressed as the tubular member 62 moves forwardly. Consequently, the tubular slide 64 is moved forwardly, causing the guide 70 also to move with it. The members 62, 64 and 70 then move together along with the solder. This continues until the forward end of the guide member 70 engages the shoulder 76 at the cutaway 75 of the feed tube 69. The member 62, however, continues to move forwardly as the trigger is compressed, advancing the solder further and directing a full length of the solder toward the work for effecting the joint. Thus, the stroke of the guide member 70 is less than that of the solder. However, the guide member 70 supports and directs the solder at the cutaway section 75 of the end of the feed tube. Within the cutaway area, the feed tube is curved in the transverse direction, which prevents lateral slippage of the solder beyond the end of the member 70.

The arcuate nature of the forward end of the feed tube 69 directs the solder to the work and facilitates the proper positioning of the solder and the accomplishment of the joint. The tip of the feed tube 69 is tilted inwardly toward the soldering iron tip, as before, when the trigger is pulled and the solder is advanced.

As soon as the joint is complete, the trigger is released and the parts returned to their original positions. The guide tube retracts immediately into the feed tube 69 away from the source of heat. Similarly, the spring 78 tilts the housing 60 back in the clockwise direction, elevating the forward end of the feed tube away from the tip of the soldering iron. This removes the solder remaining in the feed tube from the source of heat.

By being cut away at its forward end at the section 75, the feed tube allows air to circulate and to effect a cooling of the solder in the end of the feed tube, while insulating the solder from the heat of the iron. The curved configuration of the tip end also bends the solder so that it is spaced from the wall 74 of the tip and open to the air on all sides. This prevents the flux of the solder from becoming heated to the point of boiling through the periphery of the solder wire, and makes certain that the solder does not stick in the feed tube. The curved feed tube end also gives a desirable direction to the solder, so that it can be applied to the base of a joint being soldered. It also allows the solder to be brought in on the side of a lug opposite from the tip of the iron, as required in some instances. This configuration of the tip of the feed tube can be used to advantage also in the design for smaller sized solder as well as that for the larger solder.

In both versions, the feed tube is readily removable and in appropriate circumstances can be replaced with a contoured tube to direct the solder to a particular location. Thus, the device is adaptable for special situations.

The foregoing detailed description is to be clearly understood as given by way of illustration and example only, the spirit and scope of this invention being limited solely by the appended claims.

I claim:
1. A soldering device comprising:
a soldering iron having a tip,
a support means holding said soldering iron with said tip projecting therefrom,
a tubular means,
means pivotally connecting said tubular means to said support means,
 said tubular means being adapted to receive a length of solder and having an outlet at one end thereof,
 said tubular means being pivotal between a first position in which said end is remote from said tip of said soldering iron and a second position in which said end is adjacent said tip of said soldering iron,
a sleeve slidable in said tubular means remote from said outlet,
 said sleeve having a pair of opposed longitudinally extending slots through the circumferential wall thereof,
 said tubular means having a pair of opposed longitudinally extending slots therethrough,
jaw means,
 said jaw means including a pair of opposed members,
  each of said members being substantially H-shaped in plan so that said members present opposed surfaces in said sleeve on opposite sides of said solder for gripping said solder upon rotational movement of said opposed members,
 said opposed members extending through said slots in said sleeve,
 said opposed members having outer portions slidably received in said slots in said tubular means,
an abutment on either of said outer portions of said opposed members,
a bell crank pivotally mounted on said support means,
 said bell crank having a bifurcated end engaging said abutments,
  whereby upon rotation of said bell crank said opposed members are caused to rotate for gripping said solder and are moved through a stroke for thereby advancing a discrete amount of said solder through said outlet,
 said abutments being to one side of said pivotal connection between said tubular means and said support means,
  said engagement between said bifurcated end and said abutments being such that upon rotation of said bell crank a moment is produced on said tubular means for pivoting said tubular means from said first position to said second position,
resilient means normally maintaining said tubular means in said first position,
and resilient means for retracting said sleeve subsequent to said movement thereof by said bell crank.

2. A soldering device comprising
a support,
a soldering iron means carried by said support, said soldering iron means including a tip,
a guide means for receiving a length of solder wire, said guide means having an outlet,
means pivotally connecting said guide means to said support for movement between a first position in which said outlet is remote from said tip and a second position in which said outlet is adjacent said tip,
jaw means in said guide means,
means engaging said jaw means for causing said jaw means to grip said solder in said guide means and for moving said jaw means through a stroke from a retracted position to an extended position,
 thereby to advance a discrete amount of solder through said outlet,
 said jaw-engaging means contacting said jaw means to one side of said means pivotally connecting said guide means to said support for thereby creating a moment causing said guide means to pivot from said first position to said second position,
 said jaw-engaging means including
  a bell crank,
  means pivotally mounting said bell crank on said support so that one end of said bell crank is adjacent said jaw means,
  and trigger means on said support for engaging the opposite end of said bell crank for pivoting said bell crank for causing said one end of said bell crank to advance said solder and pivot said guide means,
and means normally maintaining said guide means in said first position.

3. A soldering device comprising
a support means,
a soldering iron carried by said support means, said soldering iron having a heated tip for effecting a soldered joint,
a tubular means for receiving and guiding a length of solder,
said tubular means having an outlet,
means pivotally mounting said tubular means on said support means for movement between a first position where said outlet of said tubular means is remote from said tip of said soldering iron and a second position in which said outlet of said tubular means is adjacent said tip of said soldering iron,
jaw means in said tubular means for gripping a length of solder extending through said tubular means,
 said jaw means including
  a pair of jaw members, said jaw members having opposed surfaces,
  means for guiding said members for rocking movement inwardly for engagement with opposite sides of a length of solder extending through said tubular means.
means for actuating said jaw means for so gripping said solder and for moving said jaw means through a stroke for thereby advancing solder gripped by said jaw means and ejecting a discrete amount of solder through said outlet of said tubular means,
 said means for actuating said jaw means including
  a lever engageable with said jaw members remote from said opposed surfaces for causing said rocking movement thereof upon movement of said lever, means for moving said tubular means to said second position upon said movement of said solder, and means normally maintaining said tubular means in said first position.

4. A soldering device comprising
a support means,
a soldering iron carried by said support means, said soldering iron having a heated tip for effecting a soldered joint,
a tubular means for receiving and guiding a length of solder,
said tubular means having an outlet,
means pivotally mounting said tubular means on said support means for movement between a first position where said outlet of said tubular means is remote from said tip of said soldering iron and a second position in which said outlet of said tubular means is adjacent said tip of said soldering iron,
jaw means in said tubular means for gripping a length of solder extending through said tubular means,
said jaw means including
a cylindrical member slidable in said tubular means,
said cylindrical member having a duality of slots through the circumferential wall thereof,
and a pair of gripping members in opposed relationship,
said gripping members having opposed surfaces adjacent said solder on opposite sides thereof within said said cylindrical member,
and including portions extending outwardly through said slots to the exterior of said cylindrical member for permitting pivotal movement of said gripping members upon the exertion of a force on portions of said gripping members exteriorly of said cylindrical member thereby to hold said solder between said opposed surfaces,
means for actuating said jaw means for so gripping said solder and for moving said jaw means through a stroke for thereby advancing solder gripped by said jaw means and ejecting a discrete amount of solder through said outlet of said tubular means,
said means for actuating said jaw means including
means for engaging said portions of said gripping members exteriorly of said cylindrical member for thereby exerting a force on said gripping members,
and means normally maintaining said tubular means in said first position.

5. A device as recited in claim 2 including in addition a stop engageable by said guide means in said second position for limiting the amount of pivotal movement of said guide means,
said stop being adjustable for thereby allowing adjustment of the amount of pivotal movement of said guide means and the position of said outlet relative to said tip.

6. A device as recited in claim 2 including in addition adjustable means for adjusting the length of said stroke of said jaw means.

7. A device as recited in claim 2 including in addition a stop member engaged by said one end of said bell crank when said jaw means is in said retracted position,
said stop member being adjustable for thereby permitting adjustment of the length of said stroke of said jaw means.

8. A device as recited in claim 2 including in addition means for preventing substantial movement of said solder in the opposite direction following said advancement of said discrete amount of said solder.

9. A device as recited in claim 8 in which said means for preventing substantial movement of said solder in the opposite direction includes
a resilient member,
said resilient member having an edge inclined toward said outlet and engaging the periphery of said solder for digging into said solder to preclude said substantial movement in the opposite direction.

10. A device as recited in claim 9 in which said resilient member is mounted with freedom for limited movement relative to said guide means for thereby permitting said solder a limited amount of movement in said opposite direction following said advancement of said discrete amount of solder.

References Cited

UNITED STATES PATENTS

| | | | |
|---|---|---|---|
| 3,229,885 | 9/1966 | Hurley | 228—52 |
| 3,383,024 | 5/1968 | Ashworth | 228—53 |
| 2,952,232 | 9/1960 | Sipala | 228—53 |
| 1,631,063 | 5/1927 | Rognley. | |

JOHN F. CAMPBELL, Primary Examiner

R. J. CRAIG, Assistant Examiner

U.S. Cl. X.R.

219—229; 228—52